United States Patent
Garney et al.

(10) Patent No.: US 8,062,613 B2
(45) Date of Patent: Nov. 22, 2011

(54) APPARATUS AND PROCESS FOR ISOMERIZING A HYDROCARBON STREAM

(75) Inventors: Bryan S. Garney, Crystal Lake, IL (US); Jocelyn C. Daguio, Chicago, IL (US); Kurt A. Detrick, Glen Ellyn, IL (US); David J. Shecterle, Arlington Heights, IL (US); John M. Krupczak, Hawthorn Woods, IL (US); Andrew D. Mezera, Des Plaines, IL (US); Douglas A. Becci, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 165 days.

(21) Appl. No.: 12/620,136

(22) Filed: Nov. 17, 2009

(65) Prior Publication Data

US 2011/0064622 A1 Mar. 17, 2011

Related U.S. Application Data

(60) Provisional application No. 61/243,042, filed on Sep. 16, 2009.

(51) Int. Cl.
*B01J 8/00* (2006.01)
(52) U.S. Cl. .................... 422/600; 95/41; 95/95; 95/96; 95/99; 95/117; 95/121; 95/126; 585/253; 585/734
(58) Field of Classification Search ............... 422/600; 95/41, 95, 96, 99, 117, 121, 126; 585/253, 585/734
See application file for complete search history.

(56) References Cited

U.S. PATENT DOCUMENTS 3,822,193 A 7/1974 Chapman
(Continued)

FOREIGN PATENT DOCUMENTS

DE 19713531 A1 10/1998
(Continued)

OTHER PUBLICATIONS

Robert A. Meyers, Chapter 9.2 UOP Butamer Process and Chapter 9.3 UOP Penex Process, Handbook of Petroleum Refining Processes, pp. 9.7-9.27, volume Third Edition, Publisher: McGraw-Hill, Published in: US, 2004.

*Primary Examiner* — Walter Griffin
*Assistant Examiner* — Huy-Tram Nguyen
(74) *Attorney, Agent, or Firm* — Maryann Maas

(57) ABSTRACT

An apparatus and process for isomerizing a hydrocarbon stream rich in a C4 hydrocarbon and/or at least one of a C5 and C6 hydrocarbon which includes a first drier and a second drier; and a reaction zone communicating with at least the first drier. The first drier operates at a first condition to dry the reactant and the second drier operates at a second condition during regeneration. The used regenerant remaining in the second drier after regeneration can (1) pass through a vent-to-flare assembly in a batch-wise manner; (2) pass through a downflow-depressure-to-low-pressure-device assembly in a batch-wise manner; (3) pass through a cross-over piping purge assembly to minimize upsets in the reaction and fractionation zones when the second drier is placed back in operation; or any combination of (1) (2) and/or (3) to minimize upsets in the reaction and fractionation zones when the second drier is placed back in operation.

16 Claims, 4 Drawing Sheets

U.S. PATENT DOCUMENTS

| | | | |
|---|---|---|---|
| 3,967,464 A | | 7/1976 | Cormier et al. |
| 4,008,058 A | * | 2/1977 | Wischer et al. ............. 96/126 |
| 4,324,936 A | | 4/1982 | Mikulicz |
| 4,475,295 A | | 10/1984 | Hussmann |
| 4,490,563 A | | 12/1984 | Van Pool et al. |
| 4,919,695 A | * | 4/1990 | Trepaud ..................... 96/126 |
| 5,082,989 A | * | 1/1992 | Johnson ..................... 585/748 |
| 5,350,442 A | | 9/1994 | Thelen et al. |
| 5,614,000 A | * | 3/1997 | Kalbassi et al. ............. 95/96 |
| 5,744,684 A | | 4/1998 | Zinnen et al. |
| 5,770,781 A | * | 6/1998 | Voss et al. .................. 585/253 |
| 5,779,768 A | * | 7/1998 | Anand et al. ................ 95/99 |
| 2010/0314291 A1 | | 12/2010 | Garney et al. |
| 2010/0314292 A1 | | 12/2010 | Shecterle et al. |
| 2010/0314293 A1 | | 12/2010 | Shecterle et al. |
| 2011/0064622 A1 | | 3/2011 | Garney |
| 2011/0065567 A1 | | 3/2011 | Garney |

FOREIGN PATENT DOCUMENTS

| | | |
|---|---|---|
| FR | 1588860 | 4/1970 |
| GB | 474976 | 11/1937 |
| GB | 516566 | 1/1940 |
| GB | 522988 | 7/1940 |
| GB | 699773 | 11/1953 |
| GB | 706045 | 3/1954 |
| GB | 1100313 | 1/1968 |
| GB | 1224929 | 3/1971 |
| RU | 1806317 A3 | 3/1993 |
| WO | 2007/106958 A1 | 9/2007 |

\* cited by examiner

APPARATUS AND PROCESS FOR ISOMERIZING A HYDROCARBON STREAM

CROSS-REFERENCE TO RELATED APPLICATION

This application claims priority from Provisional Application Ser. No. 61/243,042 filed Sep. 16, 2009, the contents of which are hereby incorporated by reference in its entirety.

FIELD OF THE INVENTION

The field of this invention generally relates to an apparatus and a process for isomerizing a hydrocarbon stream.

BACKGROUND OF THE INVENTION

Isomerization of light paraffins is often conducted to increase the octane content of gasoline. Generally, such isomerization processes are conducted on separate light hydrocarbon fractions. As an example, isomerization of butane, or pentane and/or hexane (hereinafter may be abbreviated pentane-hexane) is undertaken in separate isomerization units to improve the gasoline quality. Typically, both the isomerization of butane or pentane-hexane are conducted in a fixed-bed liquid/vapor phase or vapor phase process. The reactor can receive a feed of the light paraffins mixed with a gas including a substantial amount of hydrogen.

In the isomerization of butane or pentane-hexane, water is a poison that can reduce the life expectancy of the reactor catalyst. As such, it is desirable to remove water before the hydrogen rich gas and/or the paraffin feed reaches the reactor. Consequently, typically both the feed and the gas are passed through separate drier units to remove water.

Often, two driers are utilized in either series or parallel with alternating regeneration operations, whether the fluid being processed is a gas rich in hydrogen or a hydrocarbon containing butane or pentane-hexane. As such, one drier can be in operation while the other drier may be regenerating. At the end of the regeneration, the drier can contain a gas regenerant if the drier is a gas drier, or a liquid regenerant if the drier is a hydrocarbon feed drier. Depending on the hydrocarbon fraction being isomerized, the regenerant can include mostly an isomerized product, such as isobutane, or at least one of isopentane and isohexane (hereinafter may be referred to as isopentane-isohexane); or the regenerant can include a mixture of one or more different branched, normal, and cyclic compounds. In either instance, generally the regenerant is flushed out of the drier before or as the regenerated drier enters into service. The regenerant may be removed from the system as a net stream.

The gas regenerant can cause upsets in the downstream vessels. Particularly, the gas regenerant can cause a drop in reaction temperatures as the regenerant replaces the hydrogen used in the reactor, and disrupts the hydrogen:hydrocarbon mole ratio in the reactor. In addition, generally the gas regenerant has a heavier molecular weight than the hydrogen rich gas. As a consequence, replacing the hydrogen rich gas may upset the gas flow controls, such as the make-up gas flow, as well as disturbing the pressure controls in a distillation column, which is typically used downstream of the reactor. Thus, there is a desire to lessen the impact after the regeneration of the gas drier to minimize upsets of the downstream vessels.

SUMMARY OF THE INVENTION

One exemplary embodiment can be a process or apparatus for isomerizing a hydrocarbon stream rich in a C4 hydrocarbon and/or at least one of a C5 and C6 hydrocarbon. The apparatus can include a first drier and a second drier adapted to receive a fluid including at least one reactant and a reaction zone communicating with the first drier to receive the fluid including at least one reactant and with the second drier to receive the regenerant. Generally, the first drier operates at a first condition to dry the fluid including at least one reactant and the second drier operates at a second condition during regeneration with a regenerant. The regenerant remaining in the second drier and its associated piping after regeneration can (1) pass through a vent-to-flare assembly in a batch-wise manner to minimize upsets in the reaction and fractionation zones when the second drier is placed back into operation; (2) pass through a downflow-depressure-to-low-pressure-device assembly in a batch-wise manner to minimize upsets in the reaction and fractionation zones when the second drier is placed back into operation; (3) pass through a cross-over piping purge assembly to minimize upsets in the reaction and fractionation zones when the second drier is placed back into operation; or any combination of (1) (2) and/or (3).

Another exemplary embodiment can be a process or apparatus for regenerating at least one drier for an apparatus for isomerizing a hydrocarbon stream rich in a C4 hydrocarbon and/or rich in at least one of a C5 and C6 hydrocarbon. The process can include regenerating the at least one drier containing a regenerant. The regenerant remaining in the second drier after regeneration can (1) pass through a vent-to-flare assembly in a batch-wise manner to minimize upsets in the reaction and fractionation zones when the second drier is placed back into operation; (2) pass through a downflow-depressure-to-low-pressure-device assembly in a batch-wise manner to minimize upsets in the reaction and fractionation zones when the second drier is placed back into operation; (3) pass through a cross-over piping purge assembly to minimize upsets in the reaction and fractionation zones when the second drier is placed back into operation; or any combination of (1) (2) and/or (3).

Therefore, the embodiments disclosed herein can minimize upsets in operations downstream of a fluid drying zone by batch-wise displacing a used regenerant from the drying zone and removing the displaced regenerant from the process.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the hydrocarbon molecule. In addition, the term "Cn-Cn+1 hydrocarbon," such as "C5-C6 hydrocarbon," can mean at least one of a C5 and C6 hydrocarbon.

As used herein, the term "zone" can refer to an area including one or more equipment items and/or one or more sub-zones. Equipment items can include one or more reactors or reactor vessels, heaters, separators, exchangers, pipes, pumps, compressors, and controllers. Additionally, an equipment item, such as a reactor, drier or vessel, can further include one or more zones or sub-zones. It should be understood that each zone can include more equipment and/or vessels than depicted in the drawings.

As used herein, the term "vent-to-flare assembly" generally means a device made up of components that at least directly or indirectly regulates the flow of pressurized used regenerant from a newly regenerated drier in a up-flow direction to a low pressure device. An exemplary vent-to-flare assembly can include at least one line from the drier to a low pressure device, having at least one control valve or restriction orifice (the control valve gives the added benefit of being able to gradually increase or decrease the depressuring rate while the restriction orifice does not). FIG. 2 shows one exemplary vent-to-flare assembly, 500*a* and 500*b*, containing 217, 218, 218*a*, 217*b*, 220, 222, 224, 250, 252, 254. A suitable low pressure device may be a device or system at a pressure of 25 psig or less, or 5 psig or less. A suitable example of a low pressure device is a flare header or a flare knockout drum or a flare gas recovery system.

As used herein, the term "downflow-depressure-to-low-pressure-device assembly" generally means a device made up of components that at least directly or indirectly regulates the batch-wise flow of pressurized used regenerant downflow from a newly regenerated drier to a low pressure device. A low pressure device may be a device or system at a pressure of 25 psig or less, or 5 psig or less. A suitable example of a low pressure device is a knockout drum, or a flare header. An exemplary downflow-depressure-to-low-pressure-device assembly can include at least one line from the drier to a low pressure device, having at least one control valve or restriction orifice (the control valve gives the added benefit of being able to gradually increase or decrease the depressuring rate while the restriction orifice does not). The used regenerant will be depressured from the drier batch-wise in a downflow manner. FIG. 2 shows one exemplary downflow-depressure-to-low-pressure-device assembly, 600*a* and 600*b*, including 290, 288, 286, 292, 294, 296, 212, 214, 211, 298, 272, and 300.

As used herein, the term "cross-over-piping-purge assembly" generally means a device made up of components that at least directly or indirectly regulates the displacement rate of used regenerant from a newly regenerated drier. An exemplary cross-over-piping-purge assembly can include at least one line from each drier to a low pressure device, having at least one control valve or restriction orifice (the control valve gives the added benefit of being able to gradually increase or decrease the displacement rate while the restriction orifice does not), and one or more lines downstream of each drier, each line having at least one valve. The lines allow the two driers to be operated in series. A low pressure device may be a device at a pressure of 25 psig or less, or atmospheric pressure. A suitable example of a low pressure device is a knock out drum. FIG. 2 shows an exemplary cross-over-piping-purge assembly, 700*a* and 700*b*, including 217, 218, 258, 260, 262, 264, 266, 268, 272, 274, 276, 278, 280, and 282.

As used herein, the term "fluid transfer device" generally means a device for transporting a fluid. Such devices include pumps typically for liquids, and compressors typically for gases.

As used herein, the term "rich" can mean an amount generally of at least about 50%, and preferably about 70%, by mole, of a compound or class of compounds in a stream.

As used herein, the term "substantially" can mean an amount generally of at least about 90%, preferably about 95%, and optimally about 99%, by mole, of a compound or class of compounds in a stream.

As used herein, the term "absorption" can refer to the retention of a material in a bed containing an absorbent and/or adsorbent by any chemical or physical interaction between a material, such as water, and the bed, and includes, but is not limited to, absorption, and/or adsorption. The removal of the material from an absorbent may be referred to herein as "desorption."

As used herein, the term "used regenerant" can refer to a regenerant that has been used for drying or desorbing, or that has been circulated through one or more vessels or equipment items, such as a drier. A used regenerant may or may not have desorbed a material, such as water, but may be present in a vessel after the vessel contents, such as a molecular sieve, have been regenerated.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
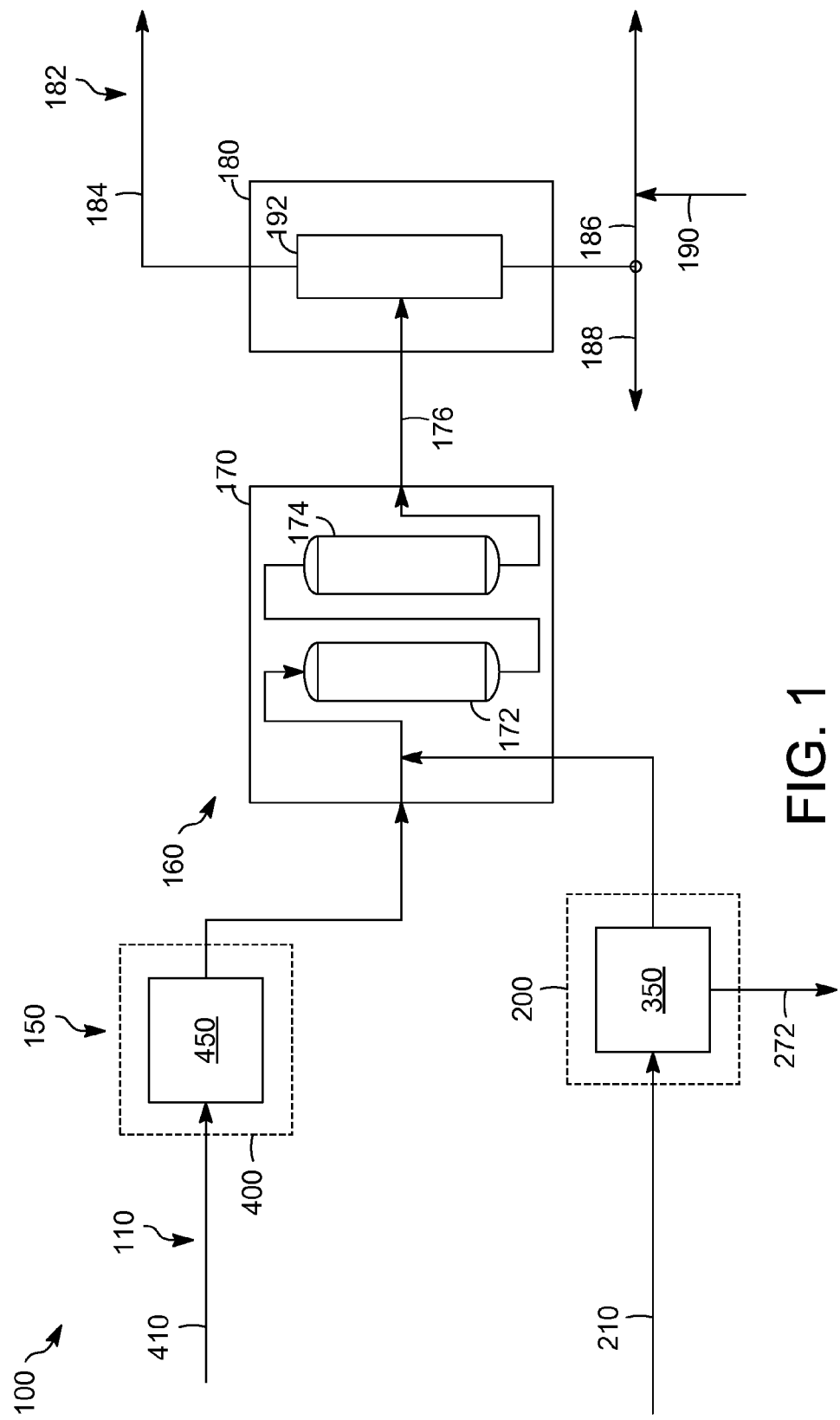
FIG. 1 is a schematic depiction of an exemplary apparatus for isomerizing a fluid.

An apparatus 100 for isomerizing a hydrocarbon stream is depicted in FIG. 1. Generally, the apparatus 100 can receive a fluid including at least one reactant 110 in either a line 210 or a line 410. Usually, the fluid 110 can be a liquid hydrocarbon stream in the line 410 or a gas rich in hydrogen in the line 210. The liquid hydrocarbon stream can be rich in a C4 hydrocarbon, such as butane, if the apparatus 100 is a C4 isomerization apparatus. Alternatively, the liquid hydrocarbon stream can be rich in a C5-C6 hydrocarbon, such as pentane-hexane, if the apparatus 100 is a C5-C6 isomerization apparatus. Exemplary apparatuses of both types are disclosed in, e.g., Nelson A. Cusher, *UOP Butamer Process and UOP Penex Process* of the Handbook of Petroleum Refining Processes, Third Edition, Robert A. Meyers, Editor, 2004, pp. 9.7-9.27. However, the apparatus 100 may also be utilized for simultaneously isomerizing a stream of one or more butanes, one or more pentanes, and one or more hexanes in some exemplary embodiments. Note that the isomerization reactions include those having largely normal paraffins as feedstock and branched paraffins as isomerate product as well as those having largely branched paraffins as feedstock and normal paraffins as isomerate product. In other words, the liquid hydrocarbon stream can be rich in isobutane or branched C5-C6 hydrocarbon. Other isomerization reactions involving the C4 or C5-C6 hydrocarbons are within the scope of the invention as well.

To simplify the discussion below, terms such as "liquid hydrocarbon" and "regenerant" may be referred to generically and should be understood to be applicable to, e.g., either a C4 isomerization apparatus or a C5-C6 isomerization apparatus. As an example, a hydrocarbon stream rich in a C4 hydrocarbon can be isomerized in a C4 isomerization reactor and an isomerized C4 hydrocarbon product can be used as a regenerant in a C4 isomerization apparatus. Likewise, a hydrocarbon stream rich in a C5-C6 hydrocarbon can be isomerized in a C5-C6 isomerization reactor, and an isomerized C5-C6 hydrocarbon product can be used as a regenerant in a C5-C6 isomerization apparatus. However, it remains within the scope of the invention to use a regenerant stream from one or more different locations of the isomerization process such as the from a fractionation zone, from driers, or perhaps even from a location external to the isomerization process. Nitrogen, for example, from a source external to the isomerization process may be used as the regenerant.

The apparatus 100 can include one or more drying zones 150, such as a liquid drying zone 450 and a gas drying zone 350, and one or more downstream operations 160, such as a reaction zone 170 and a fractionation zone 180. The liquid drying zone 450 can be comprised in a first fluid drying unit 400, and the gas drying zone 350 can be comprised in a second fluid drying unit 200. Unit 200 is discussed in further detail hereinafter. The liquid drying zone 450 can receive a liquid hydrocarbon stream from the line 410, and the gas drying zone 350 can receive a gas rich in hydrogen from the line 210. Although not shown, it should be understood that fluid transfer devices, such as pumps and compressors, can be used to transport, respectively, the hydrocarbon liquid stream and the gas rich in hydrogen. Alternatively, either fluid can be of sufficient pressure so as to not require such devices. After exiting the drying zones 450 and 250, the liquid hydrocarbon stream and the gas rich in hydrogen may be combined downstream of the drying zones 450 and 350 in, e.g., the reaction zone 170.

The one or more downstream vessels 160 can be segregated into the reaction zone 170, which can include a first reactor 172 and a second reactor 174 in series with the first reactor 172, and the fractionation zone 180, which can include one or more distillation columns 192. Although only the first reactor 172 and second reactor 174 are depicted, it should be understood that the reaction zone 170 can further include other equipment or vessels, such as one or more heaters, a recycle gas compressor, a separator vessel, and additional reactors. Alternatively, the reactors 172 and 174 can be placed in single operation. An effluent from the reaction zone 170 can pass through a line 176 to the fractionation zone 180.

The fractionation zone 180 can include one or more distillation columns 192. Although one distillation column 192 is depicted, two or more distillation columns may be operated in series and/or in a parallel. The distillation column 192 can produce one or more separated products 182, such as a first product of one or more gas products routed to, e.g., fuel gas, in a line 184 and a second product or isomerized product in a line 186. A portion of the second product can be withdrawn through a line 188 and used as a regenerant. Used regenerant can be returned to the isomerized product in a line 190, as hereinafter described. The combined stream can be sent to an isomerized product storage tank, a distillation column, or another process unit.

Figure 2:
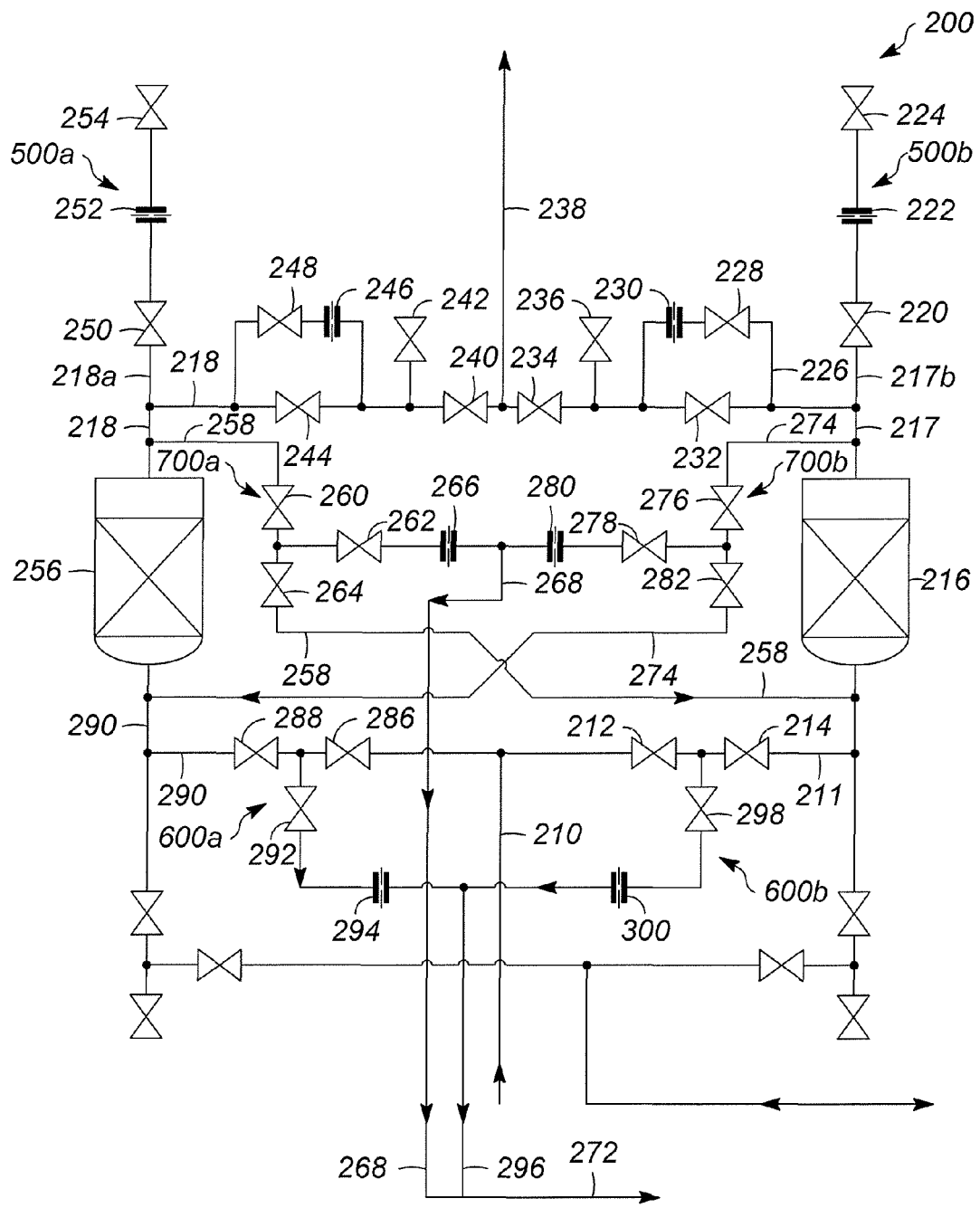
FIG. 2 is a schematic depiction of an exemplary gas fluid drying unit.

The gas fluid drying unit 200 is depicted in FIG. 2. The gas fluid drying unit can be used to dry a gas stream, such as a gas stream rich in hydrogen. Usually, the gas fluid drying unit 200 includes at least one drier 216, one or more valves, and one of the following: (1) vent-to-flare assemblies 500*a* and 500*b*; (2) downflow-depressure-to-low-pressure-device assemblies 600*a* and 600*b*; (3) cross-over-piping purge assemblies 700*a* and 700*b*. Generally, the gas fluid drying unit 200 includes a first gas drier 216 and a second gas drier 256. The driers 216 and 256 can be comprised in the gas-drying zone 350 as depicted in FIG. 1. Moreover, each drier 216 and 256 can contain a molecular sieve where absorption and/or adsorption of water and other undesirable compounds such as carbon dioxide and hydrogen sulfide occurs and include a respective internal drying zone or subzone. Generally each drier 216 and 256 operates at a first condition to dry the gas rich in hydrogen passing through the drier and a second condition to regenerate the drier. The driers 216 and 256 can operate in series and also regenerate alternatively (with one drier drying the gas rich in hydrogen at the same time the other drier is regenerating).

Upon completion of a regeneration cycle the newly regenerated drier contains used regenerant which must be displaced prior to placing the newly regenerated drier in operation. The present invention provides three assemblies for use in displacing used regenerant from a newly regenerated drier. The assemblies may be used singularly or in any combination. The assemblies will be discussed herein with the understanding that any combination of these assemblies may be used to displace used regenerant from a newly regenerated drier.

One assembly which may be employed to displace used regenerant from a newly regenerated drier is the vent-to-flare assembly 500*a* or 500*b*. As shown in FIG. 2, each drier 216 and 256 has an associated vent-to-flare assembly 500*a* or 500*b*. Collectively, the assemblies encompass line 217, line 218, line 218*a*, line 217*b*, valve 220, restriction orifice 222, valve 224, valve 250, restriction orifice 252, and valve 254. Various combinations of the valves can be opened and closed to displace the used regenerant. For example, in FIG. 2 the gas such as the gas rich in hydrogen is introduced through line 210. It is understood that driers 216 and 256 are interchangeable, but for purposes of this example, drier 216 is in a first condition drying the fluid while the drier 256 is in the second condition having just completed regeneration. Drier 256 is isolated and contains used regenerant. The gas rich in hydrogen in line 210 passes through valves 212 and 214 which are open and enter drier 216. Moisture is removed in drier 216 and the dried gas rich in hydrogen passes into line 217 and through valves 232 and 234 to reach line 238 which directs the dried gas rich in hydrogen to reaction zone 170 as depicted in FIG. 1.

The second gas drier 256 has been regenerated and contains used regenerant. Although not required, typically, the used regenerant will be in the vapor phase. Generally, the regeneration is a multiple stage process using a liquid regenerant perhaps from line 188 of FIG. 1 which may be passed to a heater prior to introduction into drier 256. Using the vent-to-flare assembly 500*a*, used regenerant can be removed from drier 256 by opening valves 250 and 254. The higher pressure in drier 256 will cause the used regenerant to flow through line 218 into line 218*a*, through valve 250, restriction orifice 252, and valve 254 and out to a low pressure device. The flow of regenerant through the vent-to-flare assembly 500*a* is batchwise and will decrease as the pressure reduces in the drier 256. For example, during the regeneration process, drier 256 may reach a pressure as high as 300 psig which may drop to—for example—approximately 10 psig after much of the used regenerant has passed through the vent-to-flare assembly 500*a*.

In some applications employing one of the vent-to-flare assemblies 500*a* and 500*b* may be sufficient to displace used regenerant from the newly regenerated drier. However, in some applications heavier hydrocarbons may remain in the newly regenerated drier, falling toward the bottom of the drier due to gravity. Applicants have found that even cycling the pressure by pressurizing the drier with dry gas rich in hydrogen and then depressurizing is not sufficient to displace the heavier hydrocarbons out of the newly regenerated drier through the lines 217 or 218 and the vent-to-flare assemblies, 500a or 500b. Therefore, in those applications in which heavier hydrocarbons may be present in a newly regenerated drier, applicants have provided additional embodiments facilitating used regenerant displacement.

In another embodiment, used regenerant may be displaced from newly regenerated drier 256 using the downflow-depressure-to-low-pressure-device assemblies 600a and 600b. As with using the vent-to-flare assemblies, 500a and 500b, the downflow-depressure-to-low-pressure-device assemblies, 600a and 600b, operate in a batch-wise manner. Assuming the vent-to-flare assembly, 500a, was employed, the newly regenerated drier 256 will be at a low pressure such as a pressure equal to the pressure of the low pressure device. To displace used regenerant in a downflow direction, the newly regenerated drier 256 must first be repressured. A portion of the dried gas stream in line 238 is routed to drier 256 in order to repressure drier 256. Valves 240 and 248 are opened with valve 242 and 244 remaining closed. The dried gas passes through restriction orifice 246 and line 218 and into newly regenerated drier 256 (since valve 250 is closed). Fluid flow continues until the pressure in drier 256 reaches an acceptable pressure of between approximately 60 and 600 psig. Applicants have found that repressuring the newly regenerated drier to approximately 80 psig generally allows suitable displacement of the used regenerant. When the newly regenerated drier contains sufficient pressure, valve 240 is again closed and valve 248 is again closed, thereby stopping the flow of dried gas rich in hydrogen from line 238 into vessel drier 256. To displace used regenerant from newly regenerated drier 256, valve 288 and valve 292 are opened, thereby allowing the pressure in vessel 256 to displace used regenerant through line 290, open valve 288, open valve 292, restriction orifice 294, and line 296. Because the fluid flow in drier 256 is in a down-flow manner, heavier hydrocarbons remaining near the bottom of drier 256 are readily displaced from the drier 256 and into line 296 and removed from the gas drying unit. When drier 256 reaches a lower pressure such as the pressure of the low-pressure-device, valves 288 and 292 may be closed to stop the fluid flow from drier 256. It is envisioned that the process of repressuring drier 256 using the gas stream rich in hydrogen in line 238 followed by the opening of valves 288 and 292 to allow displacement of the used regenerant may be repeated in a batch-wise manner until drier 256 is adequately purged of used regenerant.

In another embodiment of the invention, used regenerant which may be present in crossover piping between drier 216 and drier 256 is also displaced from the newly regenerated drier using the crossover-piping-purge assemblies, 700a and 700b. Crossover lines may contain some used regenerant from the regeneration process. The used regenerant may be either in liquid or vapor phase or both. Applicants have found that the severity and duration of the upsets experienced by the reaction and fractionation zones are reduced by displacing used regenerant from the crossover piping in addition to displacing used regenerant from the newly regenerated dryer. Purging the crossover piping may also be performed as a sole means of displacing the used regenerant, or displacing used regenerant in the crossover lines may be performed in combination with the downflow-depressure-to-low-pressure-device assembly and/or the vent-to-flare assembly.

This description assumes all three embodiments of the invention were performed in sequence and therefore the drier 256 after (1) venting to a low pressure device using the vent-to-flare assembly and (2) venting to a low pressure device using the downflow-depressure-to-low-pressure-device assembly, drier 256 would be at approximately equal to the pressure of the low-pressure-device. The next step will be to pressurize newly regenerated drier 256. The procedure is as discussed when using the downflow-depressure-to-low-pressure-device assembly. The dried fluid rich in hydrogen in line 238 passes through the open valve 240, the restriction orifice 246, and the open valve 248 in order to repressure drier 256. Valves 242, 244, and 250 remain closed. This dry gas rich in hydrogen flows until drier 256 reaches a suitable pressure, such as approximately 80 psig. At that time, valves 240 and 248 are closed, thus stopping the flow of the gas rich in hydrogen from line 238 into drier 256.

Valve 260 and 262 of crossover line purge assembly 700a are opened and a mixture of gas rich in hydrogen and possibly some used regenerant exits drier 256 in an up-flow mode and enters line 258 passing through open valve 260, open valve 262, restriction orifice 266, line 268, and into line 272. Valve 264 remains closed. Line 272 directs the mixture of used regenerant and gas rich in hydrogen to a low pressure device. When the pressure in drier 256 has dropped such that flow has essentially stopped in line 272, valve 260 is closed. Valves 240 and 248 are opened to allow dry gas from line 238 to pass through open valve 240, restriction orifice 246, and open valve 248, enter drier 256, and eventually equalize the pressure between driers 256 and 216. Valve 244 can then be opened, and valve 248 can be closed. Next drier 256 is brought back into operation, concurrent with drier 216 being in operation. Valves 276 and 282 of crossover line purge assembly 700b are opened while valve 278 remains closed. Additionally, valves 234 and 232—along with valve 220—are closed, thereby allowing dry gas rich in hydrogen to exit drier 216 through line 217, line 274, valve 276, valve 282, and eventually join with line 290. Since valve 288 is closed, the dry gas rich in hydrogen flows upwards through line 290 and into the newly regenerated drier 256. Valves 250 and 260 are closed; so the dry gas rich in hydrogen exiting drier 256 through line 218 passes through open valves 244 and 240 to reach line 238 and be conducted to the reaction zone. Valves 248 and 242 remain closed. Since line 274 should have been purged of used regenerant during the previous regeneration cycle, there should not be a sufficient quantity of heavier hydrocarbons remaining in line 274 to cause a noticeable upset in the reaction and fractionation zones if mixed with the dry gas rich in hydrogen in line 217. Driers 216 and 256 are operating concurrently in a series manner, with drier 216 in the lead position and drier 256 in the lag position. The flow of gas rich in hydrogen enters the system through line 210, passes through open valves 212 and 214, into line 211, and into drier 216. Dried gas rich in hydrogen passes through line 217, line 274, open valve 276, open valve 282, and line 290 to reach drier 256. The effluent from drier 256 passes through line 218, open valve 244, and open valve 240 to enter line 238 and be conducted to the reaction zone. Valves 234, 232, and 220 remain closed. After a period of time, the drier 216 is taken offline by opening valves 286 and 288 and closing valves 276 and 282. The incoming gas rich in hydrogen in line 210 will then pass through valves 286 and 288 and through line 290 into drier 256 to be dried. The dried gas rich in hydrogen would then flow through line 218, open valve 244, open valve 240, and line 238 to the reaction zone. Valves 212 and 214 are then closed; valves 234 and 232 remain closed. Drier 216 is now ready to start the regeneration process.

Example

Figure 3:
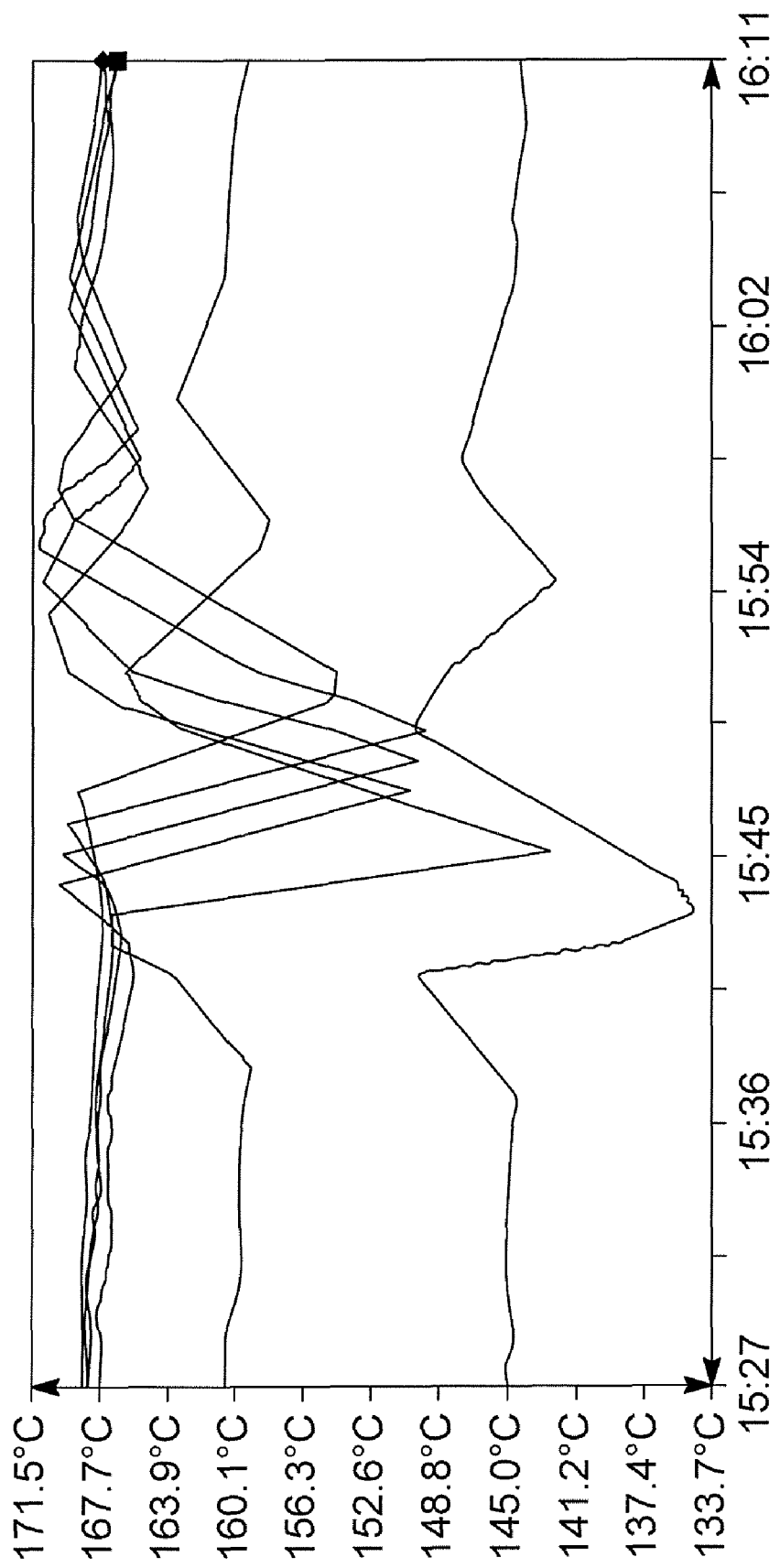
FIG. 3 is a plot of reactor temperatures versus time when no devices of the present invention are employed.
Figure 4:
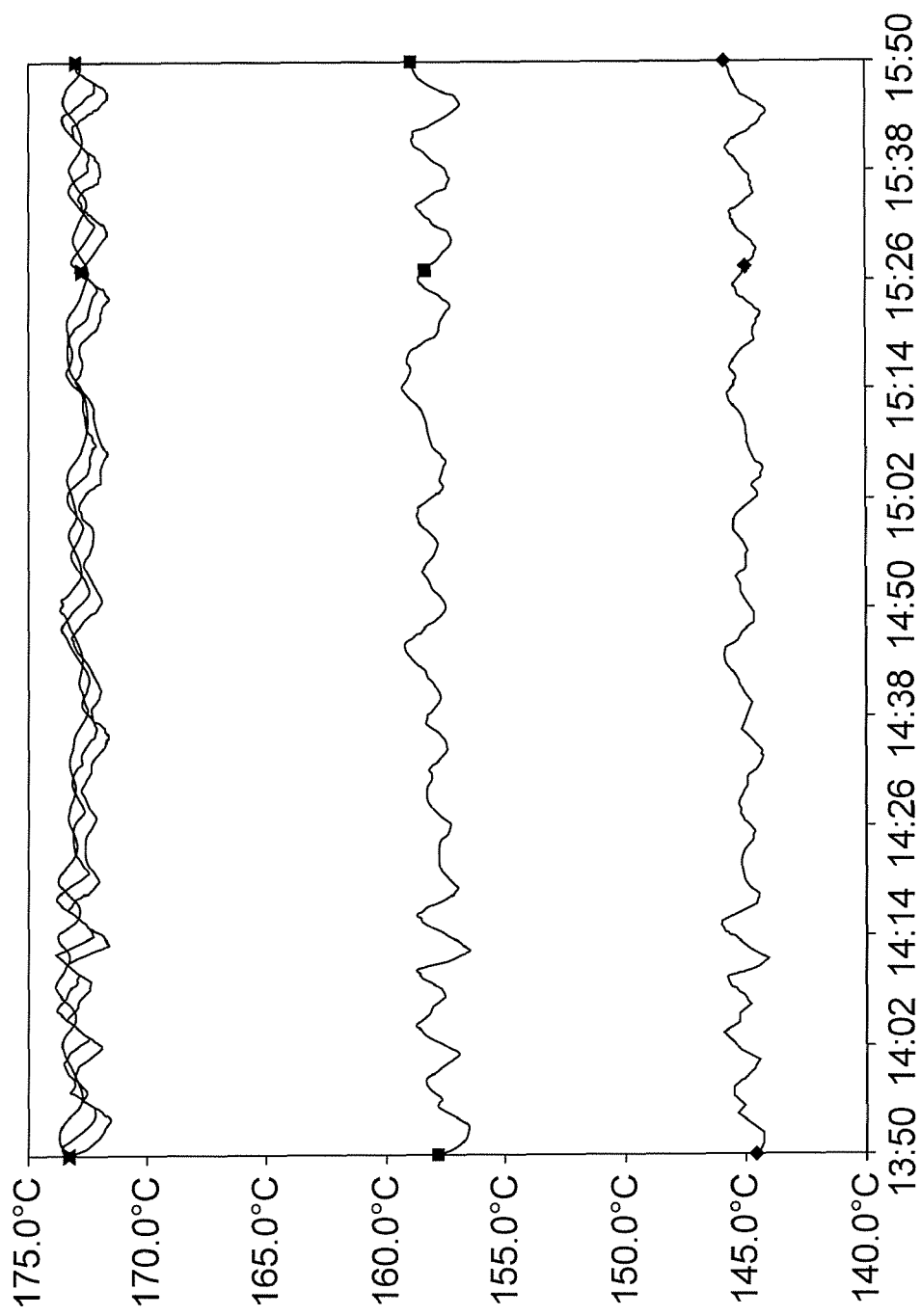
FIG. 4 is a plot of reactor temperatures versus time for the same reactors as in FIG. 3, but with the vent-to-flare assembly, the downflow-depressure-to-low-pressure-device assembly, and the cross-over-piping-purge assembly of the present invention being employed.

A traditional drier system was employed such as depicted in FIG. 2 in an isomerization process, and upsets experienced by the isomerization reactor temperatures when a freshly regenerated gas drier was placed back into operation in the lag position are shown in FIG. 3. In FIG. 3, the reactor temperatures are shown on the y axis, and the time on stream is shown on the x axis. FIG. 3 demonstrates the effect of placing a freshly regenerated gas drier back into operation in the lag position; the isomerization reactor temperatures experience a substantial upset. Compare FIG. 3 to FIG. 4. FIG. 4 was produced monitoring the same reactors. Again, reaction temperatures are shown on the y axis, and time on stream is shown on the x axis. However, the gas fluid drying unit of FIG. 4 employed the (1) vent-to-flare assemblies, 500*a* and 500*b*; (2) downflow-depressure-to-low-pressure-device assemblies, 600*a* and 600*b*; and (3) crossover-piping purge assemblies, 700*a* and 700*b*. As one can readily see from FIG. 4, when the newly regenerated drier is brought back into operation in the lag position, the severity and duration of the upset in reactor temperatures was substantially reduced.

The invention claimed is:

1. An apparatus for displacing regenerant from a drier, comprising:
  a first drier and a second drier adapted to receive a gaseous fluid comprising at least one reactant wherein the first drier operates at a first condition to dry the fluid comprising at least one reactant and the second drier operates at a second condition during regeneration with a regenerant;
  a reaction zone communicating via a first line with the first drier to receive the gaseous fluid comprising at least one reactant; and
  a vent-to-flare assembly adapted to conduct used regenerant away from the second drier and to a low pressure device.

2. The apparatus of claim 1 wherein the apparatus for displacing used regenerant from a drier is a portion of an apparatus for isomerizing a hydrocarbon stream rich in a C4 hydrocarbon and/or at least one of a C5 and C6 hydrocarbon wherein the reaction zone comprises at least one of a C4 isomerization reactor or a C5/C6 isomerization reactor; and wherein the first and second driers contain a molecular sieve.

3. The apparatus of claim 1 wherein the vent-to-flare assembly comprises:
  a second line communicating the second drier with a low pressure device wherein the second line is equipped with a restriction orifice or a control valve, and at least one valve.

4. The apparatus of claim 1 wherein the low pressure device is selected from the group consisting of a flare, a flare gas recovery system, and a knockout drum.

5. The apparatus of claim 1 further comprising a downflow-depressure-to-low-pressure-device assembly adapted to conduct batch-wise used displaced regenerant down-flow and away from the second drier and to a second low pressure device.

6. The apparatus of claim 1 further comprising a crossover-piping-purge assembly adapted to conduct used regenerant away from the second drier.

7. The apparatus of claim 1 further comprising cross-over piping and a crossover-piping-purge assembly adapted to conduct used regenerant away from the second drier and out of the crossover piping.

8. The apparatus of claim 1 further comprising a downflow-depressure-to-low-pressure-device assembly adapted to conduct batch-wise used displaced regenerant down-flow and away from the second drier and to a second low pressure device and a crossover-piping-purge assembly adapted to conduct used regenerant away from the second drier.

9. An apparatus for displacing used regenerant from a drier, comprising:
  a first drier and a second drier adapted to receive a gaseous fluid comprising at least one reactant wherein the first drier operates at a first condition to dry the fluid comprising at least one reactant and the second drier operates at a second condition during regeneration with a regenerant;
  a reaction zone communicating via a first line with the first drier to receive the gaseous fluid comprising at least one reactant; and
  a downflow-depressure-to-low-pressure-device assembly adapted to conduct batch-wise used displaced regenerant down-flow and away from the second drier and to a low pressure device wherein the downflow-depressure-to-low-pressure-device assembly comprises a second line communicating the second drier with a low pressure device wherein the second line is equipped with a restriction orifice or a control valve, and at least one valve.

10. The apparatus of claim 9 wherein the apparatus for displacing used regenerant from a drier is a portion of an apparatus for isomerizing a hydrocarbon stream rich in a C4 hydrocarbon and/or at least one of a C5 and C6 hydrocarbon wherein the reaction zone comprises at least one of a C4 isomerization reactor or a C5/C6 isomerization reactor; and wherein the first and second driers contain a molecular sieve.

11. The apparatus of claim 9 further comprising cross-over piping and a crossover-piping-purge assembly adapted to conduct used regenerant away from the second drier and out of the crossover piping.

12. An apparatus for displacing regenerant from a drier, comprising:
  a first drier and a second drier adapted to receive a gaseous fluid comprising at least one reactant wherein the first drier operates at a first condition to dry the fluid comprising at least one reactant and the second drier operates at a second condition during regeneration with a regenerant;
  a reaction zone communicating via a first line with the first drier to receive the gaseous fluid comprising at least one reactant; and
  a crossover-piping-purge assembly adapted to conduct used regenerant away from the second drier wherein the crossover-piping-purge assembly comprises a second line communicating the second drier with first drier, wherein the second line is equipped with at least three valves.

13. The apparatus of claim 12 wherein the crossover-piping-purge assembly is in communication with at least one low pressure device.

14. The apparatus of claim 12 wherein the apparatus for displacing used regenerant from a drier is a portion of an apparatus for isomerizing a hydrocarbon stream rich in a C4 hydrocarbon and/or at least one of a C5 and C6 hydrocarbon wherein the reaction zone comprises at least one of a C4 isomerization reactor or a C5/C6 isomerization reactor; and wherein the first and second driers contain a molecular sieve.

15. The apparatus of claim 12 wherein the crossover-piping-purge assembly further comprises
  a restriction orifice.

16. The apparatus of claim 12 further comprising a downflow-depressure-to-low-pressure-device assembly adapted to conduct batch-wise used displaced regenerant down-flow and away from the second drier and to a low pressure device.

\* \* \* \* \*